(12) United States Patent
Moroschan

(10) Patent No.: US 6,974,278 B2
(45) Date of Patent: Dec. 13, 2005

(54) THERMO-STRUCTURAL BASE FOR CONSTRUCTION ON UNSTABLE SOILS

(76) Inventor: Casey Moroschan, 10543 - 35 Avenue, Edmonton, Alberta (CA), T6J 2M1

(*) Notice: Subject to any disclaimer, the term of this patent is extended or adjusted under 35 U.S.C. 154(b) by 8 days.

(21) Appl. No.: 10/263,715

(22) Filed: Oct. 4, 2002

(65) Prior Publication Data
US 2004/0003571 A1 Jan. 8, 2004

(51) Int. Cl.$^7$ .......................... B27B 27/00; B27B 27/04
(52) U.S. Cl. ................ 405/258.1; 405/264; 405/128.1; 405/229; 405/270; 405/302.4; 405/302.7
(58) Field of Search ........................ 52/741.11, 309.1, 52/309.4, 309.7, 309.8, 309.13, 741.15, 741.1; 404/17, 27, 28, 31, 72, 71, 134; 405/121.1, 128.15, 154.1, 229, 239, 263, 272, 278, 303, 264, 270, 302.4, 302.7, 128.1, 258.1

(56) References Cited

U.S. PATENT DOCUMENTS 4,358,223 A * 11/1982 Jahns et al. ................ 405/157
5,494,514 A * 2/1996 Goodson et al. ............ 106/677

* cited by examiner

Primary Examiner—Jeanette E Chapman

(57) ABSTRACT

In this invention, after the grade at a construction site has been excavated and/or graded to its preliminary rough grade, re-enforcing material, typically synthetic in nature, such as nylon or polypropylene mesh or rods, fiber-glass rods or mesh, or other specified re-enforcing material is laid across soil at the construction site and a reinforced base is formed by covering the reinforcing material with a polymeric resin, whereby upon curing, the polymeric resin and reinforcing material forms a contiguous thermo-structural base. Re-enforcement material comprising synthetic and/or non-synthetic components in the form of rods, rope, strapping, mesh, netting, geotextile fabrics or other dimensional forms laid longitudinally, or in a grid pattern, in single or multiple layers, tied or not tied all in situ sprayed with a high density closed cell, water resistant expanding two component polyurethane foam system. The reinforcing material may be nylon, polypropylene, fiberglass, other synthetic or non-synthetic materials or combinations of these materials.

18 Claims, 1 Drawing Sheet

THERMO-STRUCTURAL BASE FOR CONSTRUCTION ON UNSTABLE SOILS

BACKGROUND OF THE INVENTION

This invention relates to construction of structures on soils, as for example:

(A) base preparation of sub-grades for roads surfaced with concrete or asphalt pavements, gravel or other finishes;

(B) base preparation of sub-grades relating to airport runways and tarmacs surfaced with concrete or asphalt pavement;

(C) base preparation for concrete slab-on-grade buildings, walks, outside storage areas, etc. or the base preparation of sub-grades upon which any type of free standing building, equipment, etc. is to be placed no matter what finishing materials (gravel, sand, clay, etc.) will comprise the make-up of the balance of the sub-grade; and (D) the base preparation and partial fill for the installation of water, storm and sanitary lines, and oil, natural gas and petroleum product lines.

In typical road construction, the terrain though which the road will go through is cleared, top soils removed and the preliminary grade cut out. The type of road that can then be constructed can vary but in colder climates it is not uncommon for a vapour barrier and rigid insulation to be placed on the preliminary grade and then the road bed brought up to its final grade by laying and compacting good clay material as per engineering requirements, and finished with a gravel, asphalt or concrete pavement surface. Similarly, base preparation for slab-on-grade structures requires excavation to remove organics and sub-grade preparation and in areas of permafrost and ice lensing, rigid Styrofoam™ sheets are laid to provide a thermal barrier and typically a vapour barrier is laid over the Styrofoam™ prior to concrete being poured over it.

The specifications for the construction of an airport runway or tarmac will in general be similar to that for the construction of a highway in terms of the make-up of the sub-grade. The strengths, materials tolerances, compaction requirements, etc. are more stringent but in general the process is similar. The terrain though which the runway will go through is cleared, top soils removed and the preliminary grade cut out. The type of runway to be constructed can vary but in colder climates it is not uncommon for a vapour barrier and rigid insulation to be placed on the preliminary grade and then the road bed brought up to its final grade by laying and compacting good clay material as per engineering requirements, and finished with a gravel, asphalt or concrete pavement surface.

For both roads and runways, the layer of vapour barrier (poly-ethylene sheet material) and the rigid insulation (Styrofoam™) have a number of inherent problems such as:

A) Typically the initial grade is relatively rough and uneven and can contain rocks, depressions and protruding sharp objects. This makes it difficult for a vapour barrier, if applied first, to retain its continuity when the balance of the road bed is loaded on top of it. The vapour barrier may tear and in the location of the tears, the vapour barrier will be undermined B) The Styrofoam™ sheets are typically in 4 ft×8 ft pieces laid side-by-side in a staggered pattern but because the Styrofoam™ is laid in pieces, the crack between each of the sheets may allow moisture to penetrate from the top and where the vapour barrier is broken, from the bottom. Any break in the membrane will allow the transfer of water as well as heat. Further, the cracks and or breaks in the Styrofoam™ may trap water and during the winter months, and the freeze-thaw cycle may aggravate movement and settlement of the soils above the Styrofoam™.

C) Since the Styrofoam™ is rigid and since the initial grade of the road is uneven, the road bed and the Styrofoam™ do not meet. This may result in voids being left and when the balance of the road bed is laid on top of this layer of road bed, the Styrofoam™ is more readily broken. Further, any voids under the Styrofoam™ may entrap water and the freeze thaw cycle may consequently result in heaving and probable further break-up of the rigid Styrofoam™.

D) There is low structural strength or integrity in the vapour barrier and in the Styrofoam™ because of its piecemeal nature. Therefore, any settlement of the sub-grade below the Styrofoam™ will result in settlement throughout the road bed or sub-grade including the finished surface.

Buildings or other structures may be constructed slab-on-grade such as warehousing, residences, commercial and industrial buildings, or may be free standing structures that are placed directly on grade such as oil well-head housing and other protective shelters. Structures such as sidewalks, parking lots, patios, and the like may be situated on soils that may be undermined by the presence of sub-surface frozen soils such as permafrost and ice lenses as well as soils that are on muskeg, organics and very wet soils. In each of these structures, the lack of strength in the structural base may cause structural failure of the building or other structure.

An additional problem relating specifically to the oil and gas industry is the natural gas associated with oil production in areas where permafrost and ice lensing is commonplace. Natural gas flows up the drill hole and can accumulate in the well-head protective housing and pose an extremely dangerous condition.

In the servicing of municipal sub-divisions in cold climates, it is not uncommon in the placement of underground water, storm and sewer lines to excavate a trench, drop the lines in the trench, wrap the pipes in insulation and then back-fill. Typically the trench must be quite wide to facilitate workers and equipment in the trench to insulate the pipes. If the pipes are on soils that are on permafrost or where ice lensing is a reality there is the possibility that the lines will radiate sufficient heat to break down the permafrost or ice lens resulting in voiding occurring under the utilities lines and running the very real risk of the lines settling and eventually rupturing. A similar situation arises with under ground natural gas lines and under ground oil lines laid in soils where the presence of permafrost or ice lenses is a reality.

The present invention is directed to providing a reinforced foam base to assist in the stabilization of the sub-grade and minimize sub-grade degradation of the soils which will minimize building settlement and especially differential settlement of a building or other structure constructed on top of a reinforced foam base.

SUMMARY OF THE INVENTION

According to an aspect of the invention, a method of construction comprises the steps of laying reinforcing material across soil at a construction site; and forming a reinforced base by covering the reinforcing material with a polymeric resin, whereby upon curing, the polymeric resin and reinforcing material forms a structural base.

According to another aspect of the invention, a method of construction comprises the steps of forming a reinforced foam base on unstable soil; and constructing a sub-grade on the reinforced foam base, whereby the reinforced foam base minimizes differential and uneven settlement.

In other aspects of the invention, the structural base is the base of a road, runway, or is installed at a well site, for example around a well head. The construction site may be a utility trench, and the polymeric resin may surround a utility line in the utility trench. The reinforcing material may be in the form of a grid. A preferred polymeric resin is a two part hydrophobic expanding polymeric resin. The soil may be an unstable soil, for example selected from the group consisting of permafrost, soils with ice lensing, muskeg, soil with organics and water saturated soils. The reinforcement material may be selected from the group consisting of rods, rope, strapping, mesh, netting, geotextile fabrics or other dimensional forms laid longitudinally or in a grid pattern.

Various applications of the method of construction include construction of a road, airport runway, a tarmac, a structures built slab on grade or a structure on grade, a walks, a storage area, a parking area, a dam, and a utility trench.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

Figure 1:
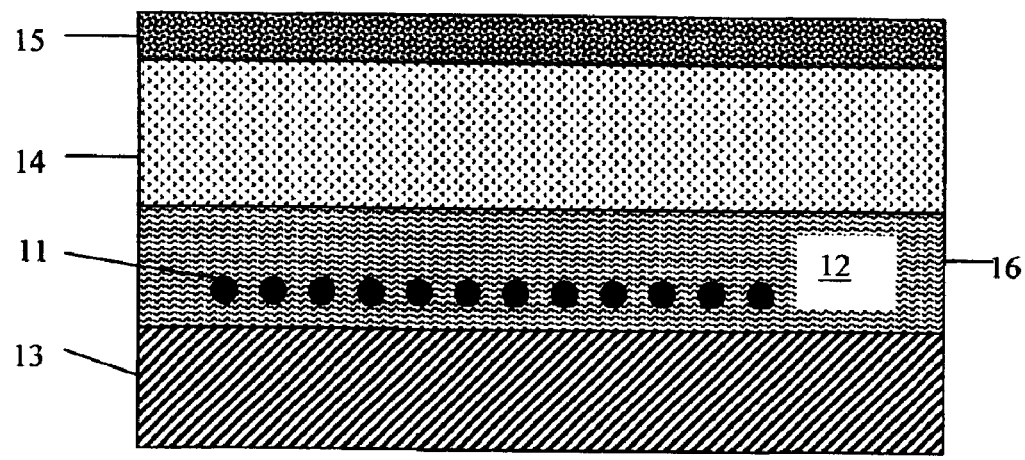
FIG. 1 is a section through a reinforced base for use with roads, runways and slab on grade structures according to the invention.

In this patent document, "comprising" means "including". In addition, a reference to an element by the indefinite article "a" does not exclude the possibility that more than one of the element is present.

A reinforced foam base is used as a base in the construction of new gravel, asphalt or concrete paved roads; in the construction of trenched utilities installations (water, storm and sanitary lines); in the construction of runways and tarmacs; in the construction of any concrete slab-on-grade structure such as building pads, pedestrian walk ways and the like; in the construction of any base upon which a free standing structure is to be constructed or placed no matter what topping or fill (such as gravel, sand, etc.) is placed on the reinforced foam base; and in the construction of a "skin" or dam for liquid holding areas.

The reinforced foam base is intended to prevent or minimize sharp and/or significant differential settlement of the bed and the surface toppings be they concrete, asphalt, gravel or some other surfacing material. The reinforced foam base protects against failure in the sub-grade matrices below the reinforced foam base because of inherent weak sub-grade characteristics of the soils due to permafrost, muskeg, ice lensing, organics, and the like. In addition, the impermeable nature of the reinforced foam base provides an excellent vapour barrier as well as a barrier to any gases such as natural gas, methane, butane, propane and the like.

In an embodiment of this invention, after the grade at a construction site has been excavated and/or graded to its preliminary rough grade, re-enforcing material, typically synthetic material, is laid across soil at the construction site. A reinforced base is formed by covering the reinforcing material with a polymeric resin. Upon curing, the polymeric resin and reinforcing material forms a contiguous thermo-structural base. The reinforcing material may have the form of rods, rope, strapping, mesh, netting, geotextile fabrics or other dimensional forms laid longitudinally, in a grid pattern or any other suitable pattern. The reinforcing material may be formed in single or multiple layers, tied or not tied. The polymeric resin is applied preferably by in situ spraying of the components of the polymeric resin onto the reinforcing material. The reinforcing material may be nylon, polypropylene, fiberglass, other synthetic or non-synthetic materials or combinations of these materials.

The polymeric resin is preferably a high density, two-part, closed cell, hydro-phobic and insulative expanding polymer resin, such as a polyurethane system, which is sprayed over the reinforcing material to a specified thickness to achieve a contiguous thermo-structural base. The particular foam system used is tailored to meet specific engineered design applications relating to insulative characteristics, tensile strength, compressive strength, shear strength and flexural strength, and other structural characteristics to meet the specific design application of the reinforced foam base for any given project. It is also possible to use other expandable substances having similar properties.

The reinforced foam base forms a thermo-structural base that bridges any current and future weak areas in the soils under the base. The reinforced foam base also provides a barrier to any water, water vapour and gases permeating through the soils under the base. Should the soils under the reinforced foam base degrade and/or settle over time, the reinforced foam base provides support for the structural material placed over the reinforced foam base, such as a building, road or utility conduit.

FIG. 1 shows a reinforced foam base 16 for use in the construction of road beds, runways, tarmacs, walkways, slab-on-grade structures, or the like. The reinforced foam base 16 includes a composite structure of a plurality of reinforcing components 11 fully encased and embedded in a pre-determined thickness of an expanding polymer resin 12. The reinforcing components 11 are oriented only longitudinally if bearing capacity warrants and should bearing capacity requirements be increased, the reinforcing components can be installed in a grid pattern or a pre-manufactured mesh can be installed. The reinforced foam base is installed directly on native soils 13 that have been cut to their desired grade. An engineered designed road bed of compacted granular material, clay, or other suitable material 14 is laid on top of the reinforced foam base 16. Atop the road bed, a designed surface 15 such as concrete pavement, asphalt pavement or compacted gravel is placed. In the case of a structure constructed slab-on-grade, compacted granular fill is placed on top of the reinforced foam base 16 and finished with a concrete topping.

Figure 2:
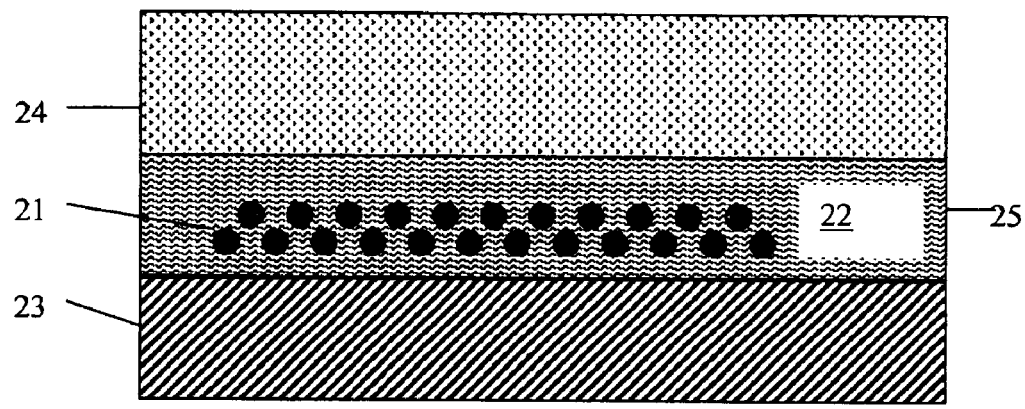
FIG. 2 is a section through a reinforced base for use with a structure on grade according to the invention.

In FIG. 2, there is shown a reinforced foam base 25 for use in the construction of a free standing building on grade with a granular base. The reinforced foam base 25 comprises a composite structure of a plurality of reinforcing components 21 fully encased and embedded in a pre-determined thickness of an expanding polymer resin 22. The reinforcing components 21 are oriented only longitudinally if bearing capacity warrants and should bearing capacity requirements be increased, the reinforcing components can be installed in a grid pattern or a pre-manufactured mesh can be installed. The reinforced foam base is installed directly on native soils 23 that have been cut to the desired grade. A bed of granular material 24 or other suitable material is laid on top of the reinforced foam base 25.

Figure 3:
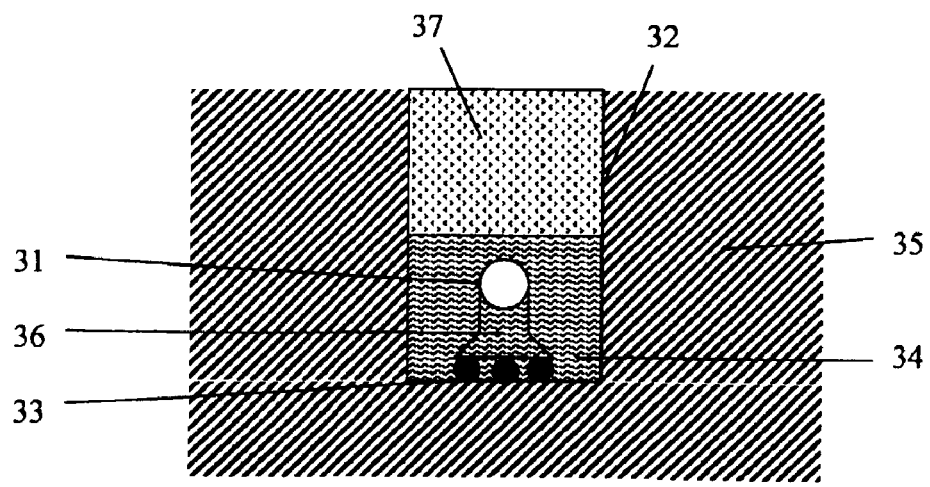
FIG. 3 is a section through a utility pipeline trench according to the invention.

In FIG. 3, there is shown a reinforced foam base 34 for use in the construction and installation of a utility pipeline or conduit 31 within native soils 35. The reinforced foam base 35 is constructed in a trench 32 that is excavated to a width suitable for the diameter of pipe being installed and the amount of insulation required to provide pre-determined thermal protection. The reinforced foam base comprises a composite structure of a plurality of re-enforcing components 33 resting on the bottom of the trench, which after application of a polymeric foam system, becomes fully encased and embedded in a pre-determined thickness of an expanding polymer resin to form reinforced foam base 34. The reinforcing components 33 are oriented longitudinally parallel with the trench line. Pre-formed pipe bases 36, each for example a stand-alone pedestal made of the same polymer resin as the reinforced foam base, are installed on the bottom of the trench. The pipe 31, which is pieced together at grade, is lowered into the trench and placed on the pre-formed polymer pipe bases 36. Polymer resin 34 is then injected into the trench to encapsulate the pipe 31 and pipe bases 36. The trench above the pipe 31 is filled with polymer resin to a depth providing the engineered R-value required to insulate the pipe 31. The balance of the trench is then back-filled and compacted with engineered fill 37.

In the case of road construction, the reinforcing material extends continuously over the length and width of the road or over the known weak area over which the road traverses. The reinforcing material that is encapsulated in the high density polymer resin provides a bridge over the weak area or weak areas. Typically it is acceptable for roads to settle if they settle equally over their length and breadth. It is unacceptable, however, when the roads develop dips, or differential settlement where continued and repetitive maintenance becomes a problem. In the case of under ground utilities the reinforced foam base ensures that should there be any settlement of the sub-grade under the service itself, the service will be protected against settlement. The reinforced foam base under the utility bridges the settlement, thus reducing bending forces on the utility conduit that might result in a break.

The high density, two part, hydrophobic expanding polymeric resin is sprayed to whatever thickness is specified to achieve the engineered thermal barrier characteristics. The polymeric resin forms a contiguous mass encapsulating the reinforcing material, thereby forming a light-weight reinforced structural mass to hold and bridge areas of the road bed that are weak due to the presence of permafrost, ice lensing, muskeg, organics or very wet soils. Since the mass is contiguous there are no breaks in it and thereby forms an unbroken solid vapour barrier. Further, since the material is in liquid form when sprayed, all depressions are filled, all protrusions in the road bed are encapsulated and there is no chance of such things under-mining the structural integrity of the reinforced foam base.

The thermal barrier to prevent heat penetration into the soils where permafrost or ice lensing may be present is controllable in terms of the required insulative requirements of the material. For example, the polymer resin may have an insulative R-value in the order of R5–R5.5 per inch of material thickness. The polymeric resin is sprayed over and around the reinforcing strands or mesh and in the case of utilities services, around the utility pipe itself to a designated thickness all around the utility line to provide the requisite thermal values. Another positive benefit of filling around the utility pipe with the expanding polymer resin is that any small openings in the pipe connections will tend to be sealed with the expanding resin thereby reducing the possibility of leaks.

The over-burden factor of introducing this process in treating a sub-grade is minimal. Depending upon the density of the polymer resin used, the weight of the material will only be in the range of 180–225 lbs per cubic meter. Further, since the material will be closed cell, water permeation is not a consideration and therefore the effects of freeze/thaw cycling will not impact the reinforced foam base.

The reinforced foam base acts as a vapour barrier as well as a barrier against permeation of heavier gases such as methane, butane, propane and natural gas through the reinforced foam base.

The reinforced foam base may be used where it is impractical to excavate and back-fill with engineered soils; where these soils are unstable due to conditions relating to permafrost, ice-lensing, muskeg, organics, wetness and other conditions contributing to voiding and/or settlement in the sub-grade soils; and where water, vapour and/or gases permeating through the sub-grade is of concern.

Immaterial modifications may be made to the invention described here without departing from the essence of the invention.

What is claimed is:

1. A method of construction, comprising the steps of:

laying reinforcing material across unstable soil at a construction site, wherein the unstable soil contains inherently weak areas; and forming a continuous reinforced thermo-structural base that bridges the inherently weak areas in the unstable soil by embedding the reinforcing material within polymeric resin in liquid form, whereby upon curing, the polymeric resin and reinforcing material forms the continuous reinforced thermo-structural base.

2. The method of claim 1 in which the structural base is the base of a road.

3. The method of claim 1 in which the construction site is on permafrost.

4. The method of claim 3 in which the construction site is at a well site.

5. The method of claim 1 in which the construction site is a utility trench, and the reinforcing material is laid along the trench.

6. The method of claim 5 in which the polymeric resin surrounds a utility line in the utility trench.

7. The method of claim 1 in which the reinforcing material comprises a grid.

8. The method of claim 1 in which the polymeric resin is a two part hydrophobic expanding polymeric resin.

9. The method of claim 1 in which the soil is selected from the group consisting of permafrost, soils with ice lensing, muskeg, soil with organics and water saturated soils.

10. A road constructed using the method of claim 1.

11. A runway constructed using the method of claim 1.

12. A structural base for a slab-on-grade structure, where the structural base is formed using the method of claim 1.

13. A utility trench formed using the method of claim 1.

14. A method of construction, comprising the steps of:

forming a reinforced foam base on unstable soil that contains weak areas, the reinforced foam base forming a bridge over the weak areas, by embedding reinforcing material within a hydrophobic foam applied in liquid form onto the unstable soil; and constructing a sub-grade on the reinforced foam base, whereby the reinforced foam base minimizes differential and uneven settlement of the sub-grade.

15. The method of claim 14 in which the method is used to construct a selected one of a road, airport runway, a tarmac, a structure built slab on grade or a structure on grade, a walkway, a storage area, a parking area, a dam, and a utility trench.

16. The method of claim 14 in which the reinforced foam base comprises reinforcement material embedded within an expanding polymeric resin.

17. The method of claim 16 in which the reinforcement material is selected from the group consisting of rods, rope, strapping, mesh, netting, geotextile fabrics or other dimensional forms laid longitudinally or in a grid pattern.

18. The method of claim 16 in which the expanding polymeric resin is a closed cell, hydrophobic two part polymer resin applied over the reinforcing material to a pre-determined thickness to meet engineered thermal and water/gas permeability requirements for the reinforced foam base.

* * * * *